United States Patent [19]

Kobayashi et al.

[11] 3,924,248

[45] Dec. 2, 1975

[54] NON DESTRUCTIVE READ OUT MAGNETIC CORE MEMORY APPARATUS HAVING LINEAR HYSTERESIS LOOP NOISE CANCELLING CORE

[75] Inventors: Seihin Kobayashi; Michihiro Torii, both of Shizuoka, Japan

[73] Assignee: Fuji Electrochemical Co., Ltd., Tokyo, Japan

[22] Filed: Jan. 2, 1974

[21] Appl. No.: 429,740

[52] U.S. Cl. ....................... 340/174 DC; 340/174 RC; 340/174 DA; 340/174 M

[51] Int. Cl.² ....................... G11C 7/02; G11C 1/67

[58] Field of Search 340/174 DC, 174 RC, 174 DA, 340/174 M

[56] References Cited

UNITED STATES PATENTS

| | | | |
|---|---|---|---|
| 3,308,448 | 3/1967 | Shahbender | 340/174 DC |
| 3,488,642 | 1/1970 | Maeda | 340/174 DC |
| 3,543,256 | 11/1970 | Genke | 340/174 DC |
| 3,599,191 | 8/1971 | Gillett | 340/174 DC |

*Primary Examiner*—Stanley M. Urynowicz, Jr.
*Attorney, Agent, or Firm*—Fleit & Jacobson

[57] ABSTRACT

There is provided a non destructive read out magnetic core memory apparatus in which two saturated magnetic states of a square loop hysteresis characteristic are corresponded to a binary "1" and a binary "0" to inspect a difference of permeability with respect to the magnetic core. The apparatus comprises a device for supplying a cancelling voltage of a binary 1 or a binary 0 to sense lines of the apparatus.

3 Claims, 8 Drawing Figures

Figure 1A:
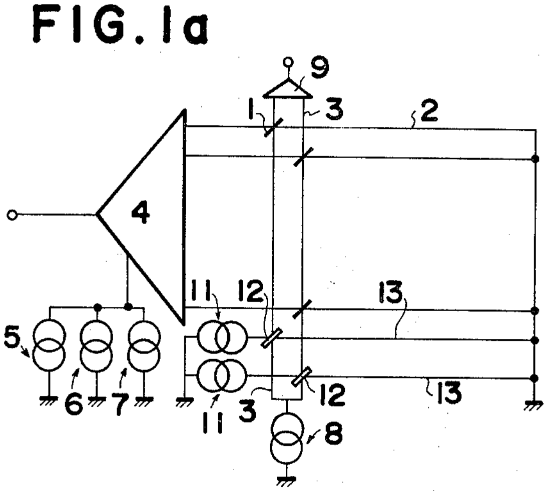

NON DESTRUCTIVE READ OUT MAGNETIC CORE MEMORY APPARATUS HAVING LINEAR HYSTERESIS LOOP NOISE CANCELLING CORE

The present invention relates to a read-only memory device (hereinafter called EAROM) which can effect electric rewriting for use in information processing equipment such as electronic computers and electronic switch-boards, and more specifically to the EAROM employing toroidal ferrite cores arranged in rows and columns.

So far, as EAROM using toroidal ferrite cores, there have been proposed a method in which one of the saturated residual states of the square-loop magnetization characteristics curve of the ferrite core and a partial switching state are related to a binary information that will be stored, and the difference in inclination of the magnetization characteristics curve, i.e., the difference in permeability, is utilized to irreversibly perform the reading, and a method in which one of the saturated residual magnetization states in the square-loop magnetization characteristics curve and other saturated residual magnetization state are related to a binary stored information 1 and 0, and utilizing the difference in magnetic flux change when a driving magnetic flux that would not cause magnetic reversing is applied, in order to perform non-destructive reading. The inventors of this application have found that the EAROM employing the toroidal ferrite core of this type produces poor output in terms of absolute values and poor difference between output 1 and output 0, i.e., poor S/N ratio compared to ordinary non-destructive magnetic core memory plane, making it difficult to discriminate the output signals. On the other hand, the so-called two-core/bit system which constitutes one bit using two cores and offsets the 0 output or 1 output using two cores to increase signal-to-noise ratio, is desirable from a viewpoint of S/N ratio, but it requires 2 times as many magnetic cores for the same amount of memory capacity, and is uneconomical.

Therefore, an object of this invention is to provide a non-destructive read out magnetic core memory apparatus which facilitates easy discrimination of the output signals.

Another object of the invention is to provide a high-density non-destructive read out magnetic core memory apparatus being compact and economical.

Further object of the invention is to provide a non-destructive read out magnetic core memory apparatus having large memory capacity.

Figure 1B:
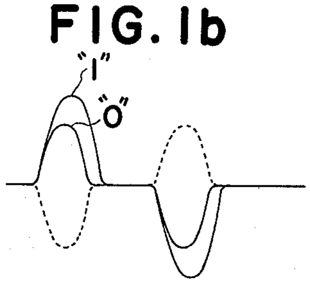
Figure 1C:
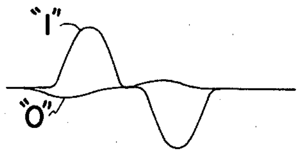

According to the present invention, there is provided a non-destructive read out memory apparatus which comprises a magnetic core memory plane of one-core/bit system comprising an X line and a Y line, toroidal ferrite cores having square-loop magnetization characteristics being arrayed in a matrix, a read driver to feed, to the driving wires penetrating through said core, a read current to cause reversible change of magnetic flux to the selected cores storing 1 or 0 information, a sense amplifier to detect the voltage induced by the reversible change of magnetic flux of said cores, and a cancelling means to apply to a sense amplifier a voltage which is smaller in absolute value than the voltage induced by the reversible magnetic flux change of said core which is accumulating 1 information, in the direction opposite to said voltage. The aforementioned and other objects and features of the present invention will become more clearly apparent from the detailed description thereof, which is to be read with reference to the accompanying drawings, in which:

FIGS. 1 (*a*), (*b*) and (*c*) are circuit views of a first embodiment of the non-destructive read out magnetic core memory apparatus of the present invention and output wave forms.

Figure 2:
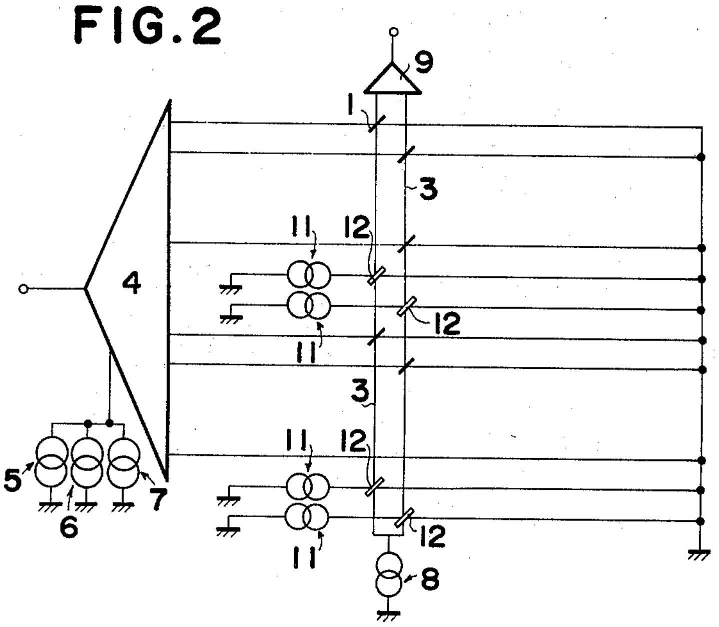

FIG. 2 is a circuit view showing a second embodiment of the non-destructive read out magnetic core memory apparatus of the present invention, and FIGS. 3 (*a*), (*b*) and (*c*) are circuit views of a third embodiment of the present invention and output wave forms.

Figures 3A, 3B, 3C, 4:
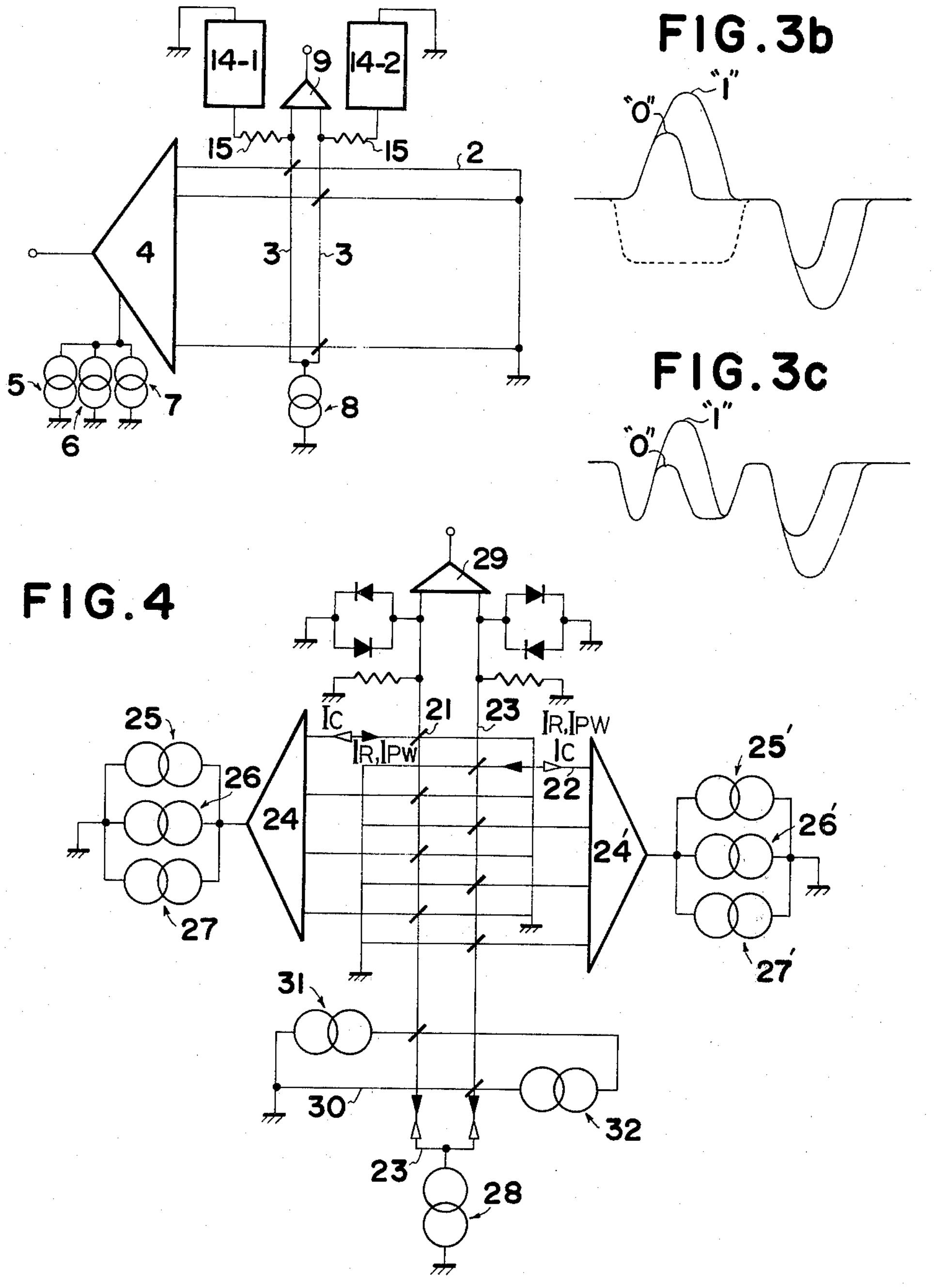

FIG. 4 is a circuit view of a fourth embodiment of the present invention, Referring now to FIG. 1 (*a*), a word line 2 and a digit-sense line 3 are threaded through ferrite cores 1 which are arranged in rows and columns to form a matrix, and at the end of said word line 2 is installed an address decoder 4 and other end of the word line is grounded. On the address decoder 4 have been installed a clear driver 5, a write driver 6 and a read driver 7. Two wires constitute a pair of digit-sense line of which one end being short-circuited. On one side of the digit driver 8 has been installed a sense amplifier 9.

As for an operation mode, a clear current from the clear driver 5 helps switch all of the cores linked to a selected word line into a saturated residual magnetization state. This is a so-called cleared state. Writing of information consists of feeding a write current from the write driver 6, and bringing the write current into coincidence with the digit current from the digit drive 8, so that an information of 1 or 0 may be written on a memory address depending on the presence or absence of the digit current. For read out, a current of the same polarity as that of write current is used, thereby detecting a change in reversible magnetic flux.

Furthermore, on the digit-sense line 3 is disposed a linear core 12 having a magnetic linear hysteresis loop characteristic for cancelling. Through the cancelling linear core 12 is inserted a cancelling line 13 of which one end is grounded and other end is linked to the canceling driver 11. Read-out cycle is performed by an address decoder which selects the word line; as the word line selected is served with a read-out current from the read driver 7, a canceling current is simultaneously supplied to the canceling line 13 from the canceling driver 11 to magnetize the cancelling linear core 12, and a cancelling output is produced on the digit-sense line. In FIG. 1 (*b*), the solid line represents 1, outputs where no cancelling core is present, and the broken line represents an output from the canceling core. The output from the cancelling core assumes a polarity opposite to that of 0 output, and it is desired that the output be larger in absolute value than the 0 output. By doing so, The 1 output and the 0 output may be rendered to be of opposite polarity with regard to each other, facilitating easy discrimination of output signals. FIG. 1 (*c*) shows output signal wave forms sensed at both ends of the sense amplifier 9.

However, in the case of a large capacity memory having great numbers of cores linked to the digit-sense lines of the above-mentioned setup, as there develops difference between the distance from the memory core selected from both ends of the sense amplifier 9 and the distance to the cancelling core therefrom, there also develops difference in transmission time between the output signal from the selected memory core to the sense amplifier 9 and the cancelling output from the cancelling core to the sense amplifier, tending to cause phase deviation between the 0 output and the cancelling output. Hence in the case of large capacity memory devices, it is effective to employ the circuit configuration shown in FIG. 2.

The circuit configuration shown in FIG. 2 consists of providing a cancelling core for every several to several tens of words in order to confine the transmission time difference from the memory core and canceling core to the sense amplifier 9, i.e., to define the phase difference within an allowable limit, and is particularly suited for use in large capacity memory devices.

FIG. 3 (*a*) shows a circuit of another ambodiment of the present invention. Like the circuit shown in FIG. 1(*a*); canceling voltage generators 14-1 and 14-2 consisting of switching elements such as transistors and diodes connected via resistance 15 to the input terminal of the sense amplifier 9, are provided, and either one of the canceling voltage generators 14-1 or 14-2 is operated depending on the position of the memory core with respect to the sense amplifier 9, to directly supply a voltage to the digit-sense line 3. This voltage is of an opposite polarity to the output signal from the memory core, and it is desired that the amplitude be a little larger than the 0 output. In FIG. 3 (*b*), the solid line represents an output from the memory core, and the broken line represents a canceling voltage wave form from the canceling voltage generator. FIG. 3 (*c*) shows output signal wave forms sensed at both ends of the sense amplifier 9. Where the phase difference between the output signal and the canceling voltage is of a problem, the phase of the canceling voltage may be adjusted for every several to several tens of words, like the configuration shown in FIG. 2.

Referring to FIG. 4 showing the fourth embodiment of the present invention, a digit-sense line 23 is threaded through the ferrite core 21, a word line is provided with address decoders 24, 24′ for the purpose of address segmentation, and with clear drivers 25, 25′ write drivers 26, 26′ , and read drivers 27, 27′, and the digit-sense line 23 is provided with a digit driver 28 and a sense amplifier 29.

The operation mode consists of, first, supplying a word current from the word drivers 25 and 25′ to the word line 22, so that the cores penetrated by the word line are all switched to a saturated residual magnetization state. Then the writing of fixed information is performed by the digit current from the digit driver 28; formation of a so-called binary mode. In this case, the drivers 25, 25′, 26, 26′, 27, 27′ and decoders 24, 24′ are divided into right and left as shown in FIG. 4 to segmentate the word address. Hence currents flow in the opposite directions through the adjacent word lines, and the word lines are grounded. In the read-out cycle, a read current is supplied from the read driver 27 to the word line 22, and a canceling current is supplied from canceling drivers 31, 32 to a canceling line 30, and the read-out is effected in such a manner as to cancel the induced noise.

By the aforedescribed setup, it is allowed to segmentage the word driver and address decoder, and accordingly, to heighten the memory packing density.

As mentioned in the foregoing, according to the EAROM employing toroidal ferrite cores of the present invention, the canceling voltage generator means is provided on the sensing line or the canceling voltage is directly applied to the sensing line from the external unit, thus improving a one-core/bit system which, despite of its economical feature, had been impracticable because of its poor S/N ratio, and consequently providing an EAROM which is excellent economically and operationally.

What is claimed is:

1. A non-destructive read-out magnetic core memory apparatus comprising:

a plurality of toroidal magnetic cores having a square-loop magnetic characteristic arranged in a matrix;

a plurality of digit-sense lines;

a plurality of word lines crossing said digit-sense lines;

said digit-sense lines and word lines being threaded through said toroidal magnetic cores;;

a read driver connected to said word lines to supply a read current to cause reversible magnetization change to a selected core among said toroidal cores;

a plurality of digit drivers connected to said digit-sense lines; and a plurality of cancelling means comprising a cancelling conductor parallel to said word lines, a cancelling driver connected to said cancelling conductor, and a cancelling toroidal core having a magnetic linear hysteresis loop characteristic;

said cancelling core being penetrated with said digit-sense line and said cancelling conductor in a crossing manner.

2. A non-destructive read out magnetic core memory apparatus as claimed in claim 1, wherein said cancelling means is provided for every plurality number of words, thereby to reduce the difference in transmission time from said memory core and said canceling means to said sense amplifier.

3. A non-destructive read-out magnetic core memory apparatus as claimed in claim 1, including an address decoder, write driver and clear driver provided on both sides of said matrix to divide the word address into two, whereby currents are provided in opposite direction through the adjacent word lines.

* * * * *